United States Patent [19]
Brown

[11] Patent Number: 5,350,195
[45] Date of Patent: Sep. 27, 1994

[54] DEVICE FOR CLAMPING SEAT BELT WEBBING

[75] Inventor: Louis R. Brown, Oxford, Mich.

[73] Assignee: TRW Vehicle Safety Systems Inc., Lyndhurst, Ohio

[21] Appl. No.: 10,594

[22] Filed: Jan. 28, 1993

[51] Int. Cl.⁵ ............................................. B60R 22/36
[52] U.S. Cl. .................................. 280/806; 280/808; 297/483
[58] Field of Search ............... 280/805, 806, 808, 801; 297/470, 480, 483; 242/107.3, 107.4 R

[56] References Cited

U.S. PATENT DOCUMENTS

| | | | |
|---|---|---|---|
| 4,624,422 | 11/1986 | Hollowell | 280/806 X |
| 4,687,253 | 8/1987 | Ernst et al. | 280/806 X |
| 4,718,148 | 1/1988 | McKernon et al. | 280/808 X |
| 4,854,644 | 8/1989 | Ernst | 297/476 |

Primary Examiner—Margaret A. Focarino
Assistant Examiner—Victor E. Johnson
Attorney, Agent, or Firm—Tarolli, Sundheim & Covell

[57] ABSTRACT

A clamp mechanism (30) clamps seat belt webbing (24). The clamp mechanism (30) has an actuated position in which the belt webbing (24) is clamped and an unactuated position in which the belt webbing may move relative to the clamp mechanism. A linkage mechanism includes a shaft member (58) pivotable about a first axis (50) and a link (62) carried by the shaft member (58) and pivotable about a second axis which is the axis of the shaft member (58). The shaft member (58) pivots about the first axis (50) when a predetermined tension force is applied to one portion of the belt webbing (24). The link (62) pivots about the second axis when the shaft member (58) pivots about the first axis to actuate the clamp mechanism (30) to clamp the belt webbing (24).

9 Claims, 3 Drawing Sheets

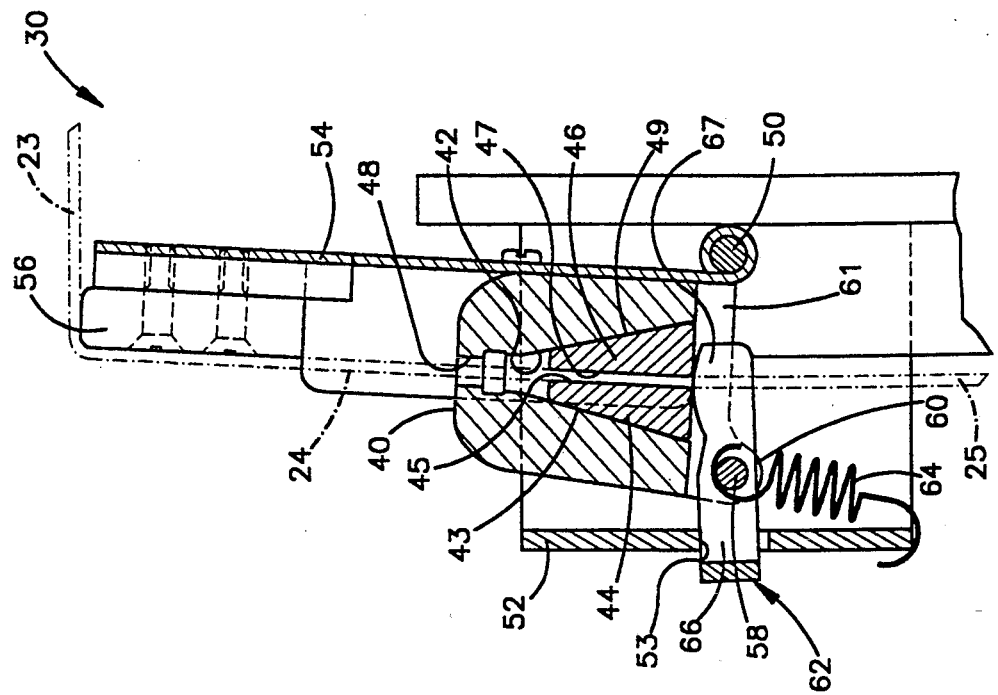
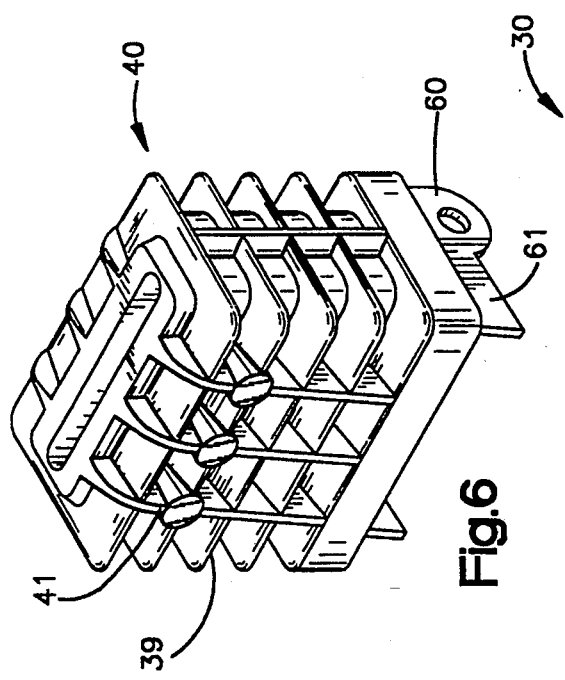
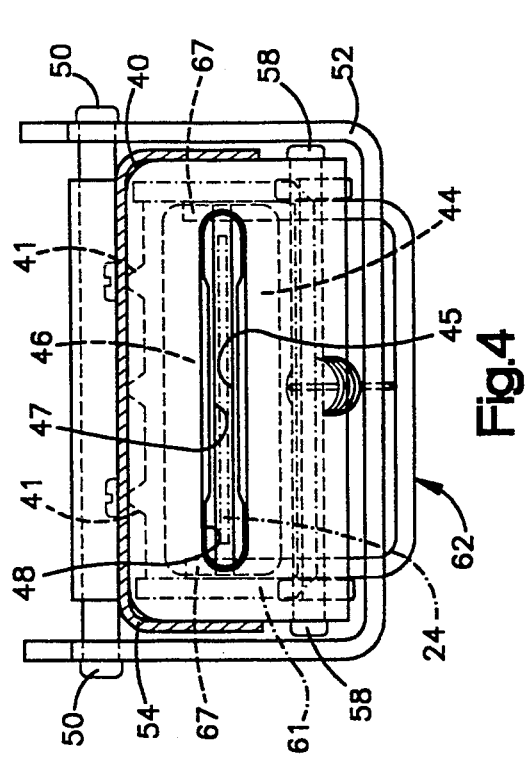

DEVICE FOR CLAMPING SEAT BELT WEBBING

BACKGROUND OF THE INVENTION

Technical Field

The present invention relates to a device for clamping seat belt webbing. The invention is particularly directed to a device for clamping seat belt webbing to reduce transfer of tension force from one portion of the belt webbing to another portion of the belt webbing when a predetermined tension force is applied to the one portion of the belt webbing, such as upon the occurrence of a vehicle collision.

Background Art

Devices for clamping seat belt webbing are known. A known device for clamping seat belt webbing is disclosed in U.S. Pat. No. 4,854,644. The device disclosed in U.S. Pat. No. 4,854,644 includes a belt clamping wedge. The device also includes a control lever which pivots in response to a predetermined amount of tension being applied to one portion of the belt webbing. When the control lever pivots in response to the predetermined amount of tension being applied to the one portion of the belt webbing, the clamping wedge moves to clamp the belt webbing so that the tension is not transferred to another portion of the belt webbing.

SUMMARY OF THE INVENTION

In accordance with the present invention, a device clamps vehicle seat belt webbing to reduce transfer of tension force from one portion of the belt webbing to another portion of the belt webbing when a predetermined tension force is applied to the one portion of the belt webbing. The device comprises a clamp mechanism for clamping the belt webbing between the portions of the belt webbing. The clamp mechanism has an actuated position in which the belt webbing is clamped and an unactuated position in which the belt webbing may move relative to the clamp mechanism. Means is provided for actuating the clamp mechanism to clamp the belt webbing. The actuating means comprises a linkage mechanism which is actuated by a predetermined tension force being applied to the one portion of the belt webbing. The linkage mechanism includes a member pivotable about a first axis and a link pivotally carried by the member for pivotal movement about a second axis relative to the member.

The linkage mechanism includes (i) means for pivoting the member about the first axis when the predetermined tension force is applied to the one portion of the belt webbing, and (ii) means for enabling the link to pivot about the second axis when the member pivots about the first axis. The link has a portion which engages the clamp mechanism to actuate the clamp mechanism. The link including the clamp actuating portion pivots about the second axis to actuate the clamp mechanism to clamp the belt webbing. The extent of angular movement of the clamp actuating portion of the link about the second axis is greater than the extent of angular movement of the member about the first axis when the predetermined tension force is applied to the one portion of the belt webbing. Thus, there is an amplification of movement of parts of the linkage mechanism for actuating the clamp mechanism.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a sectional view taken approximately along line 4—4 in FIG. 3;

FIG. 5 is a view similar to FIG. 2, but showing parts in a different position; and FIG. 6 is a perspective view of a housing part used in the clamping device of FIG. 1.

DESCRIPTION OF A PREFERRED EMBODIMENT

Figure 1:
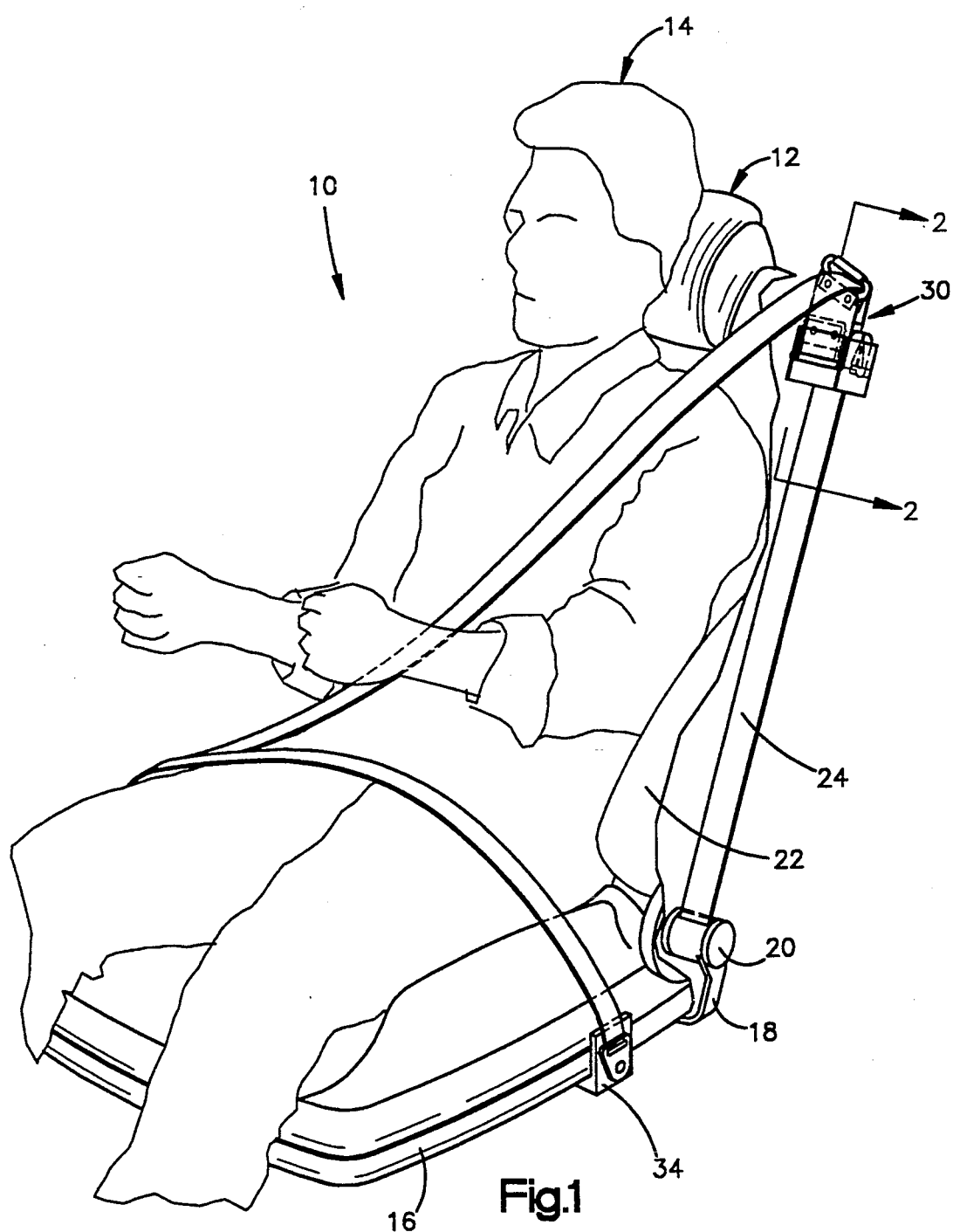
FIG. 1 is a perspective view of a vehicle seat belt system incorporating a clamping device constructed in accordance with the present invention.
Figure 3:
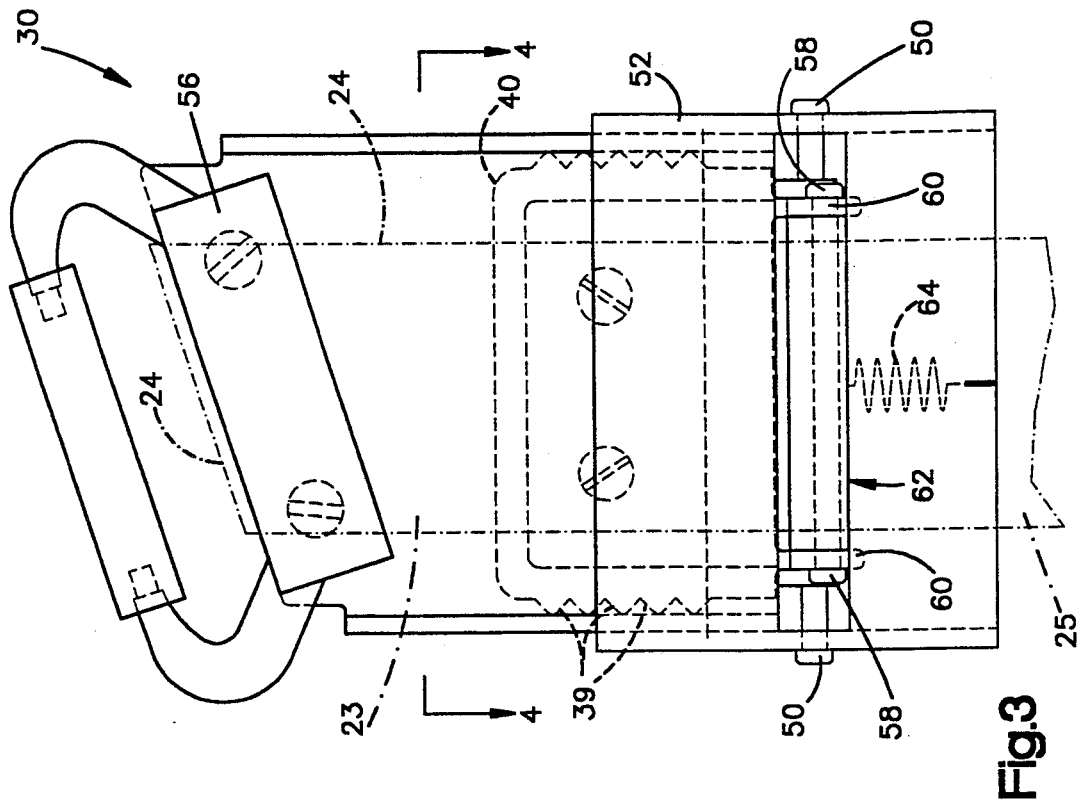
FIG. 3 is a view taken in the direction of line 3—3 of FIG. 2.

The present invention is directed to a device mounted on a vehicle for clamping seat belt webbing to reduce transfer of tension force from one portion of the belt webbing to another portion of the belt webbing when a predetermined tension force is applied to the one portion of the belt webbing, such as upon occurrence of a vehicle collision. The specific construction of the clamping device may vary. As shown in FIG. 1, a clamping device constructed in accordance with the present invention is embodied in an integrated seat/seat belt arrangement 10.

The seat/seat belt arrangement 10 includes a vehicle seat 12 for an occupant 14. The seat 12 has a base 16. A seat belt retractor 20 is mounted to the base 16 of the seat 12 via a bracket 18. The seat 12 also has a back 22 constructed of a relatively rigid beam capable of withstanding a substantial vehicle frontal collision with a minimal amount of deflection and/or deformation.

The seat belt retractor 20 includes a spool (not shown) about which seat belt webbing 24 is wound. The belt webbing 24 is routed from the retractor 20 behind the seat back 22 and upward along the seat back 22 toward an actuatable device 30 for, when actuated, clamping the belt webbing 24. A portion of the seat back 22 is removed in FIG. 1 to better show the clamping device 30 and the belt webbing 24. The belt webbing 24 passes through the clamping device 30 which is actuated when a predetermined amount of tension force is applied to the belt webbing 24, such as during a vehicle collision. From the clamping device 30, the belt webbing 24 extends across the torso of the occupant 14 to a sliding tongue and buckle assembly (not shown). The belt webbing 24 then extends back across the lap of the occupant 14, and terminates at an anchor bracket 34 secured to the base 16 of the seat 12 near the bracket 18.

Referring to FIGS. 2–6, the clamping device 30 includes a housing 40 defining an open-ended chamber 42 which receives a pair of wedge members 44, 46. As best shown in FIG. 6, the exterior of the housing 40 has a plurality of horizontally extending ribs 39 and a plurality of vertically extending ribs 41. The horizontally extending ribs 39 extend around the housing 40. The vertically extending ribs 41 extend between the horizontally extending ribs 39. The horizontally extending ribs 39 and the vertically extending ribs 41 provide structural strength to the housing 40.

The wedge members 44, 46 are normally spaced apart from one another in the chamber 42 so as to permit the belt webbing 24 to pass between the wedge members 44, 46 freely. The housing 40 has a slotted opening 48 which is located above and communicates with the chamber 42. The belt webbing 24 passes through the opening 48. The wedge member 44 has an inclined sliding surface 43 facing a correspondingly inclined sliding surface on the housing 40. Similarly, the wedge member 46 has an inclined sliding surface 49 facing a correspondingly inclined sliding surface on the housing 40.

Opposite its inclined sliding surface 43, the wedge member 44 has an inner high friction surface 45 for engaging one side of the belt webbing 24. Similarly, opposite its inclined sliding surface 49, the wedge member 46 has an inner high friction surface 47 for engaging the other side of the belt webbing 24. The inner high friction surfaces 45, 47 face toward each other.

The housing 40 is fastened to the lower portion of a bracket 54. The bracket 54 is mounted on a shaft 50. The bracket 54 pivots with the shaft 50 about the longitudinal central axis of the shaft 50. The shaft 50 is pivotally mounted to a mounting bracket 52 which, in turn, is secured to the beam of the seat back 22. Attached to the upper portion of the pivotal bracket 54 is a webbing guide 56. The webbing guide 56 provides a low friction turning surface for the belt webbing 24 as the belt webbing 24 extends down from the webbing guide 56 and across the upper torso of the occupant 14. Although the housing 40, the pivoting bracket 54, and the webbing guide 56 are shown and described as separate parts, it is contemplated that these parts may be made into one die cast part if required for manufacturing economy.

The housing 40 includes a downwardly projecting skirt 61 having a pair of flanges 60 (best shown in FIG. 6) which support a shaft 58. The shaft 58 is fixed to the flanges 60 and does not rotate relative to them. The shaft 58 is spaced laterally from the chamber 42 and the wedges 44, 46. One end of a preloaded extension spring 64 is operatively connected to the shaft 58.

A locking link 62 is mounted on the shaft 58 for pivotal movement relative to the shaft 58. The locking link 62 has a U-shape and spans the width of the belt webbing 24 because the legs of the U are spaced apart a distance greater than the width of the belt webbing 24. The legs of the U-shaped locking link 62 include opposite outer end portions 67 (see FIG. 4). The opposite outer end portions 67 of the legs of the U-shaped locking link 62 are disposed adjacent to, but spaced apart from, the opposite edges of the belt webbing 24. The upper surface of each of the end portions 67 is curved and contacts the adjacent end surfaces of both wedge members 44, 46. The end portions 67 of the legs of the locking link 62 thus support the wedge members 44, 46 in the chamber 42.

When a sensor (not shown) located in the retractor 20 senses vehicle deceleration of at least a predetermined magnitude, such as occurs in a vehicle collision, a locking pawl (also not shown) located in the retractor 20 actuates to block rotation of the retractor spool in the belt webbing unwinding direction. As the vehicle decelerates, the upper torso of the occupant 14 moves forward in the seat 12 against the belt webbing 24. Since the retractor spool is locked, the movement of the upper torso of the occupant 14 against the belt webbing 24 produces tension loads on the belt webbing 24. The tension loads act on the webbing guide 56, the bracket 54 (to which the webbing guide 56 is attached), the housing 40 which is fastened to the bracket 54, and the shaft 58 supported by the housing 40.

Figure 2:
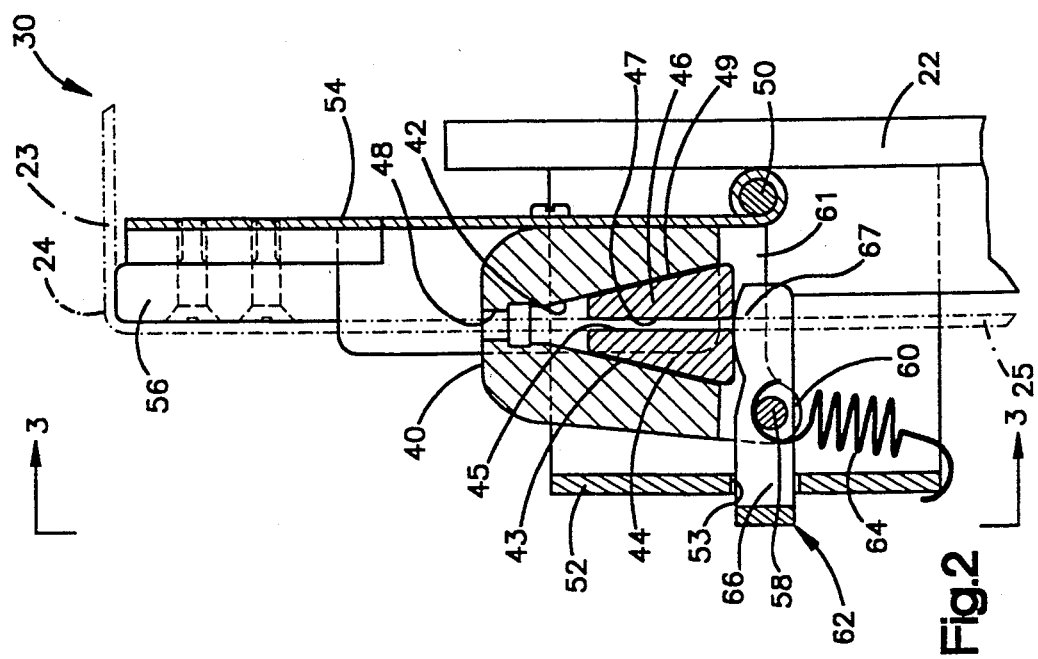
FIG. 2 is a view taken in the direction of line 2—2 of FIG. 1 showing some parts in section.

When the tension in the belt webbing 24 reaches a predetermined amount, approximately 30 pounds, for example, the spring 64 acting on the shaft 58 yields to permit the shaft 58, the housing 40, the bracket 54, and the webbing guide 56 to pivot about the longitudinal central axis of the shaft 50. These parts pivot about the longitudinal central axis of the shaft 50 from an initial position of the parts, as shown in FIG. 2. The extent of pivoting is preferably about three degrees. As the shaft 58, the housing 40, the bracket 54, and the webbing guide 56 pivot about the longitudinal central axis of the shaft 50 due to the tension loads applied to the webbing guide 56 by the belt webbing 24, the shaft 58 moves upward, as viewed in the drawings. As the shaft 58 moves upward, the locking link 62 which is mounted on the shaft 58 moves upward and the wedges 44, 46 move upward. A portion 66 of each leg of the U-shaped locking link 62 moves into contact with the bottom edge 53 of the mounting bracket 52 after about 1° (one degree) of angular movement of the shaft 58 about the axis of the shaft 50. The portion 66 of each leg which contacts the mounting bracket 52 is adjacent the base of the U-shaped link 62 and thus at the end of the leg opposite the outer end portion 67.

When the portion 66 of each leg of the locking link 62 contacts the bottom edge 53 of the mounting bracket 52 and the shaft 58 continues to move upward, the link 62 pivots about the bottom edge 53 of the mounting bracket 52 and relative to the axis of shaft 58 in a counterclockwise direction. As the link 62 pivots counterclockwise relative to the axis of the shaft 58, the opposite outer end portions 67 of the U-shaped link 62 move upward relative to the housing 40. The end portions 67 thus press upward against the ends of the wedge members 44, 46 and there,by slide the wedge members 44, 46 upward along the inclined sliding surfaces 43, 49. When the wedge members 44, 46 slide upward, the inner high friction surfaces 45, 47 of the wedge members 44, 46 move towards each other to clamp the belt webbing 24, as shown in FIG. 5. The belt webbing 24 is thus divided into two belt portions 23, 25. When the belt webbing 24 is clamped, the belt webbing cannot slide relative to the wedge members 44, 46. Additional tension in the one portion 23 of the belt webbing 24, created as a result of the occupant 14 moving against the belt webbing, is not transferred to the other portion 25 of the belt webbing 24. Thus, by clamping the belt webbing 24 in response to a vehicle collision in a manner as just described, most of the load of the occupant against the belt webbing 24 is not transferred to the spool of the retractor 20.

It should be apparent that the extent of movement of certain parts of the clamping device 30 is amplified to actuate the clamping device 30. More specifically, after the link 62 engages the bottom edge 53 of the bracket 52, which occurs after about 1° (one degree) of movement of the shaft 58 about the axis of the shaft 50, the shaft 58 continues to move about the axis of the shaft 50 approximately another 2° (two degrees). During this 2° (two degrees) of movement of the shaft 58 about the axis of the shaft 50, the locking link 62 pivots about the axis of the shaft 58 an angular amount slightly greater than 4° (four degrees). This is due to the fact that the distance between the axes of the shafts 50 and 58 is more than twice the distance between the bottom edge 53 of the bracket 52 and the axis of the shaft 58.

The amount of angular movement of the locking link 62 about the axis of the shaft 58 is a function of the ratio of the distance between the axes of the shafts 50 and 58 to the distance between the bottom edge 53 of the bracket 52 and the axis of the shaft 58. In fact, the angular movement of the locking link 62 can be increased by locating the shaft 58 farther away from the shaft 50 and closer to the bottom edge 53 of the bracket 52. By thus increasing or amplifying the extent of movement of the shaft 58, less movement of the shaft 58 is needed to actuate the clamping device 30 in response to the predetermined amount of tension applied to the one portion 23 of the belt webbing 24. Because the shaft 58 needs to move less, the housing 40 and the webbing guide 56 similarly need to move less.

After the high vehicle deceleration dissipates, tension in the one portion 23 of the belt webbing 24 may be removed because the load of the occupant 14 is no longer acting on the belt webbing 24. When this occurs, the biasing force of the spring 64 acts to move the shaft 58, the locking link 62, the housing 40, the bracket 54, and the webbing guide 56 back to their initial positions as shown in FIG. 2.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. A device mounted on a vehicle for clamping seat belt webbing to reduce transfer of tension force from one portion of the belt webbing to another portion of the belt webbing in response to a predetermined tension force being applied to the one portion of the belt webbing, said device comprising:

a clamp mechanism including a pair of clamping members which are movable towards each other to clamp the belt webbing between the portions of the belt webbing, said clamp mechanism having an actuated position in which the belt webbing is clamped between said clamping members and an unactuated position in which the belt webbing may move relative to said clamping members; and means for actuating said clamp mechanism to move said clamping members toward each other and thereby to clamp the belt webbing between said clamping members, said actuating means comprising a linkage mechanism including a member pivotable about a first axis and a link pivotally carried by said member for pivotal movement about a second axis relative to said member;

said linkage mechanism including (i) means for pivoting said member about said first axis in response to the predetermined tension force being applied to the one portion of the belt webbing, and (ii) means for enabling said link to pivot about said second axis when said member pivots about said first axis in response to the predetermined tension force being applied to the one portion of the belt webbing, said link having a clamp actuating portion for actuating said clamp mechanism to move said clamping members toward each other and thereby to clamp the belt webbing between said clamping members upon said link pivoting about said second axis in response to said member pivoting about said first axis.

2. A device according to claim 1 wherein the extent of angular movement of said clamp actuating portion of said link about said second axis is greater than the extent of angular movement of said member about said first axis when the predetermined tension force is applied to the one portion of the belt webbing.

3. A device according to claim 1 further including spring means for biasing said member to an initial position when no tension force is applied to the one portion of the belt webbing.

4. A device according to claim 1 wherein said member is pivotable about a first shaft having a longitudinal central axis which comprises said first axis.

5. A device according to claim 4 wherein said member comprises a second shaft having a longitudinal central axis which comprises said second axis.

6. A device according to claim 1 wherein said pair of clamping members includes a pair of wedge members defining an opening through which the belt webbing extends, each of said wedge members including an inclined sliding surface and a clamping surface which faces the clamping surface of the other wedge member, said wedge members being (i) slidable in one direction along their inclined sliding surfaces to enable their clamping surfaces to move towards each other, thereby to clamp the belt webbing between the two portions of the belt webbing, and (ii) slidable in another direction along their inclined sliding surfaces to enable their clamping surfaces to move away from each other, thereby to allow the belt webbing to move through the opening defined between said wedge members, said wedge members being moved by said clamp actuating portion along their inclined sliding surfaces in the one direction to clamp the belt webbing between said clamping surfaces of said wedge members in response to said link pivoting about said second axis.

7. A device mounted on a vehicle for clamping seat belt webbing to reduce transfer of tension force from one portion of the belt webbing to another portion of the belt webbing in response to a predetermined tension force being applied to the one portion of the belt webbing, said device comprising:

a clamp mechanism for clamping the belt webbing between the portions of the belt webbing, said clamp mechanism having an actuated position in which the belt webbing is clamped and an unactuated position in which the belt webbing may move relative to said clamping mechanism; and means for actuating said clamp mechanism to clamp the belt webbing, said actuating means comprising a linkage mechanism separate from said clamp mechanism, said linkage mechanism including (i) a member pivotable about a first axis relative to said clamp mechanism, and (ii) a link pivotally carried by said member for pivotal movement about a second axis relative to said member and relative to said clamp mechanism;

said linkage mechanism including (i) means for pivoting said member about said first axis in response to the predetermined tension force being applied to the one portion of the belt webbing, and (ii) means for enabling said link to pivot about said second axis when said member pivots about said first axis in response to the predetermined tension force being applied to the one portion of the belt webbing, said link having a clamp actuating portion for actuating said clamp mechanism to clamp the belt webbing upon said link pivoting about said second axis in response to said member pivoting about said first axis, the extent of angular movement of said clamp actuating portion of said link about said second axis being greater than the extent of angular movement of said member about said first axis when the predetermined tension force is applied to the one portion of the belt webbing.

8. A device mounted on a vehicle for clamping seat belt webbing to reduce transfer of tension force from one portion of the belt webbing to another portion of the belt webbing in response to a predetermined tension force being applied to the one portion of the belt webbing, said device comprising:

- a clamp mechanism including a pair of clamping members which are movable towards each other to clamp the belt webbing between the portions of the belt webbing, said clamp mechanism having an actuated position in which the belt webbing is clamped between said clamping members and an unactuated position in which the belt webbing may move relative to said clamping members;

- means for actuating said clamp mechanism to move said clamping members toward each other and thereby to clamp the belt webbing between said clamping members, said actuating means comprising a linkage mechanism including a member pivotable about a first axis and a link pivotally carried by said member for pivotal movement about a second axis relative to said member;

said linkage mechanism including (i) means for pivoting said member about said first axis in response to the predetermined tension force being applied to the one portion of the belt webbing, and (ii) means for enabling said link to pivot about said second axis when said member pivots about said first axis in response to the predetermined tension force being applied to the one portion of the belt webbing, said link having a clamp actuating portion for actuating said clamp mechanism to move said clamping members toward each other and thereby to clamp the belt webbing between said clamping members upon said link pivoting about said second axis;

- said member being pivotable about a first shaft having a longitudinal central axis which comprises said first axis, said member comprising a second shaft having a longitudinal central axis which comprises said second axis; and

- a spring operatively connected with said second shaft, said spring providing a biasing force to bias said second shaft to an initial position when no tension force is applied to the one portion of the belt webbing.

9. A device according to claim 8 wherein the extent of angular movement of said clamp actuating portion of said link about said second axis is greater than the extent of angular movement of said second shaft about said first axis when the predetermined tension force is applied to the one portion of the belt webbing.

* * * * *